(12) United States Patent
Miyokawa et al.

(10) Patent No.: US 10,498,098 B2
(45) Date of Patent: Dec. 3, 2019

(54) SLIP RING, ROTATION SENSOR DEVICE HAVING SLIP RING, AND METHOD OF MANUFACTURING SLIP RING

(71) Applicant: Jeco Co., Ltd., Saitama (JP)

(72) Inventors: Taiki Miyokawa, Saitama (JP); Hikoshi Izumi, Saitama (JP); Noboru Watanabe, Saitama (JP)

(73) Assignee: Jeco Co., Ltd., Saitama (JP)

( * ) Notice: Subject to any disclaimer, the term of this patent is extended or adjusted under 35 U.S.C. 154(b) by 35 days.

(21) Appl. No.: 16/033,563

(22) Filed: Jul. 12, 2018

(65) Prior Publication Data

US 2018/0323564 A1 Nov. 8, 2018

Related U.S. Application Data

(63) Continuation of application No. PCT/JP2017/035861, filed on Oct. 2, 2017.

(30) Foreign Application Priority Data

Dec. 27, 2016 (JP) ................................ 2016-253369

(51) Int. Cl.
*H01R 39/12* (2006.01)
*H02K 13/00* (2006.01)
(Continued)

(52) U.S. Cl.
CPC ............. *H01R 39/12* (2013.01); *H01R 39/38* (2013.01); *H01R 43/10* (2013.01); *H02K 13/003* (2013.01)

(58) Field of Classification Search
CPC ...... H02K 5/141; H02K 13/003; H01R 39/12; H01R 39/38; H01R 43/10
(Continued)

(56) References Cited

U.S. PATENT DOCUMENTS 2,880,402 A * 3/1959 Gardner ................ G01K 13/08
439/20
6,194,673 B1 2/2001 Sato et al.
(Continued)

FOREIGN PATENT DOCUMENTS

JP H11-39998 2/1999
JP 2001-167666 6/2001
(Continued)

OTHER PUBLICATIONS

International Search Report for PCT/JP2017/035861 dated Dec. 19, 2017.

*Primary Examiner* — Terrance L Kenerly
(74) *Attorney, Agent, or Firm* — IPUSA, PLLC

(57) ABSTRACT

A slip ring for use in a slip ring brush type rotation sensor device, includes a metal ring having an approximately cylindrical shape, and a resin ring that supports the metal ring. Slits extending in an axial direction are formed in respective side surfaces on outer peripheries of the metal and resin rings. The metal ring includes a common part formed on a side surface at one end along the axial direction of the approximately cylindrical shape and segmented by the slits into segments to form common regions, so that adjacent common regions are electrically connectable to each other, and a detection part formed on a side surface at the other end and segmented by the slits into segments to form conducting regions and isolated regions that are alternately provided with the slit interposed between adjacent conducting and isolated regions.

10 Claims, 13 Drawing Sheets

(51) Int. Cl.
*H01R 39/38* (2006.01)
*H01R 43/10* (2006.01)

(58) Field of Classification Search
USPC .......................................................... 310/232
See application file for complete search history.

(56) References Cited

U.S. PATENT DOCUMENTS

| | | | | |
|---|---|---|---|---|
| 8,899,991 | B2 * | 12/2014 | Ickler | H01R 24/40 |
| | | | | 439/11 |
| 9,039,423 | B2 * | 5/2015 | Shinder-Lerner | H01R 39/64 |
| | | | | 310/232 |
| 9,065,232 | B2 * | 6/2015 | Li | H01R 39/06 |
| 2001/0003682 | A1 | 6/2001 | Takahashi et al. | |
| 2001/0004584 | A1 | 6/2001 | Aquilar et al. | |
| 2002/0125113 | A1 | 9/2002 | Bhakta et al. | |
| 2004/0113499 | A1 | 6/2004 | Ikawa et al. | |
| 2004/0160138 | A1 * | 8/2004 | Kuroda | H02K 5/1732 |
| | | | | 310/90 |

FOREIGN PATENT DOCUMENTS

| | | |
|---|---|---|
| JP | 2001-236859 | 8/2001 |
| JP | 2002-313182 | 10/2002 |
| JP | 2002-340609 | 11/2002 |
| JP | 2003-247857 | 9/2003 |
| JP | 3756032 | 3/2006 |
| JP | 3764835 | 4/2006 |
| JP | 2010-119258 | 5/2010 |
| JP | 2013-117457 | 6/2013 |

\* cited by examiner

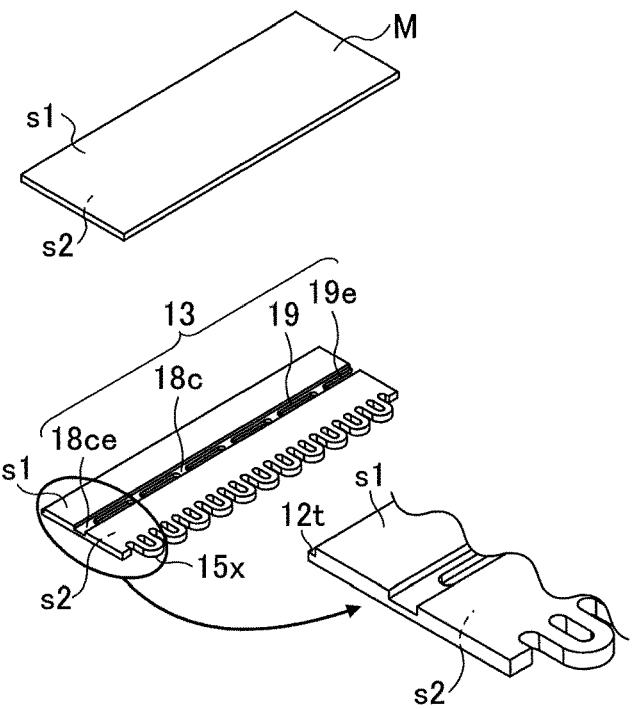
FIG.5A
FIG.5B
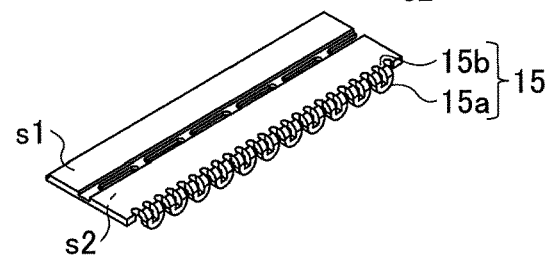
FIG.5C
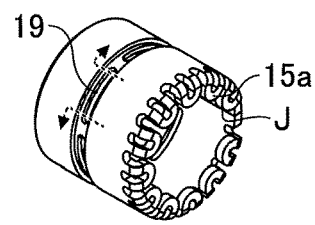
FIG.5D
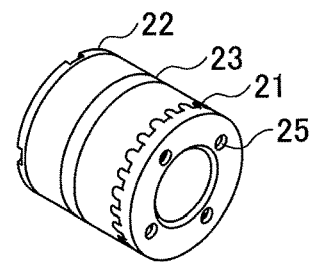
FIG.5E
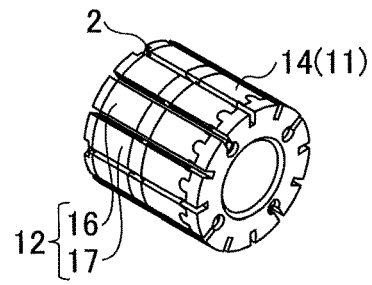
FIG.5F

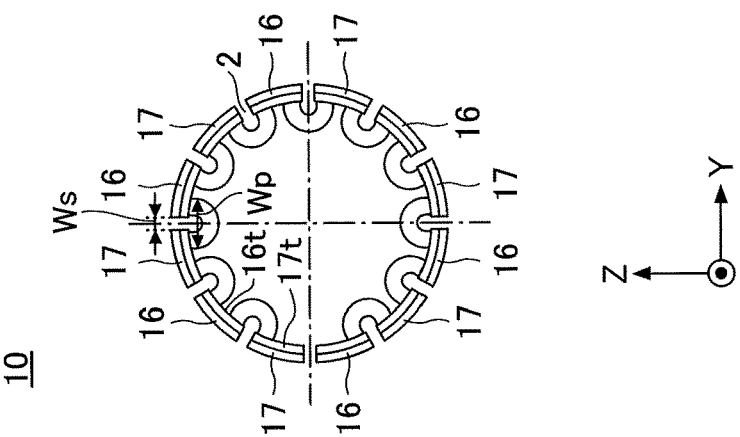
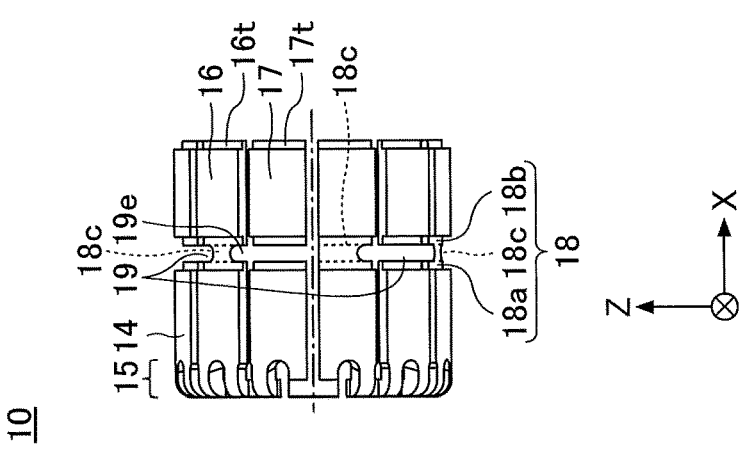
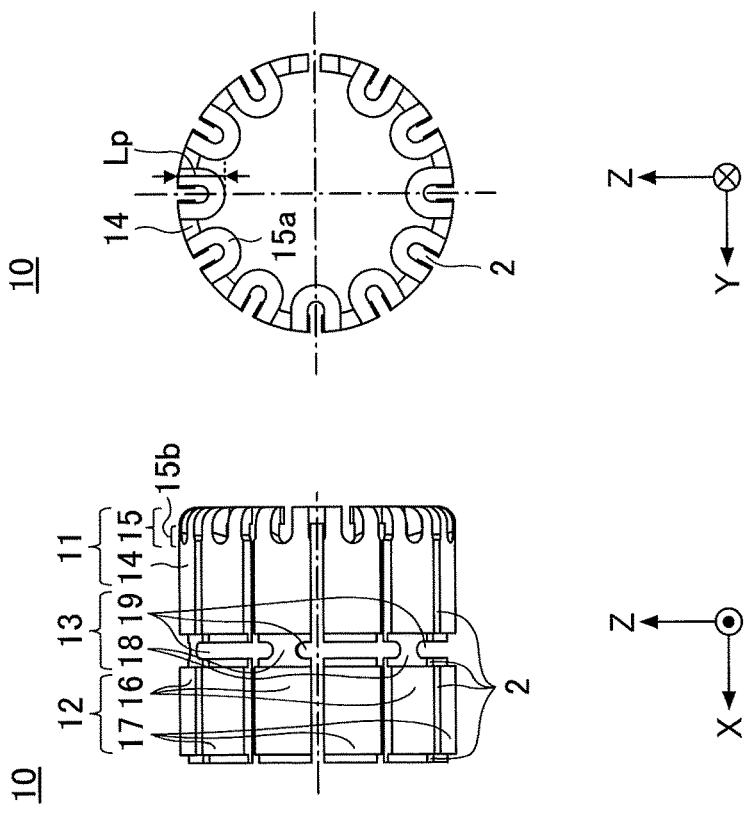

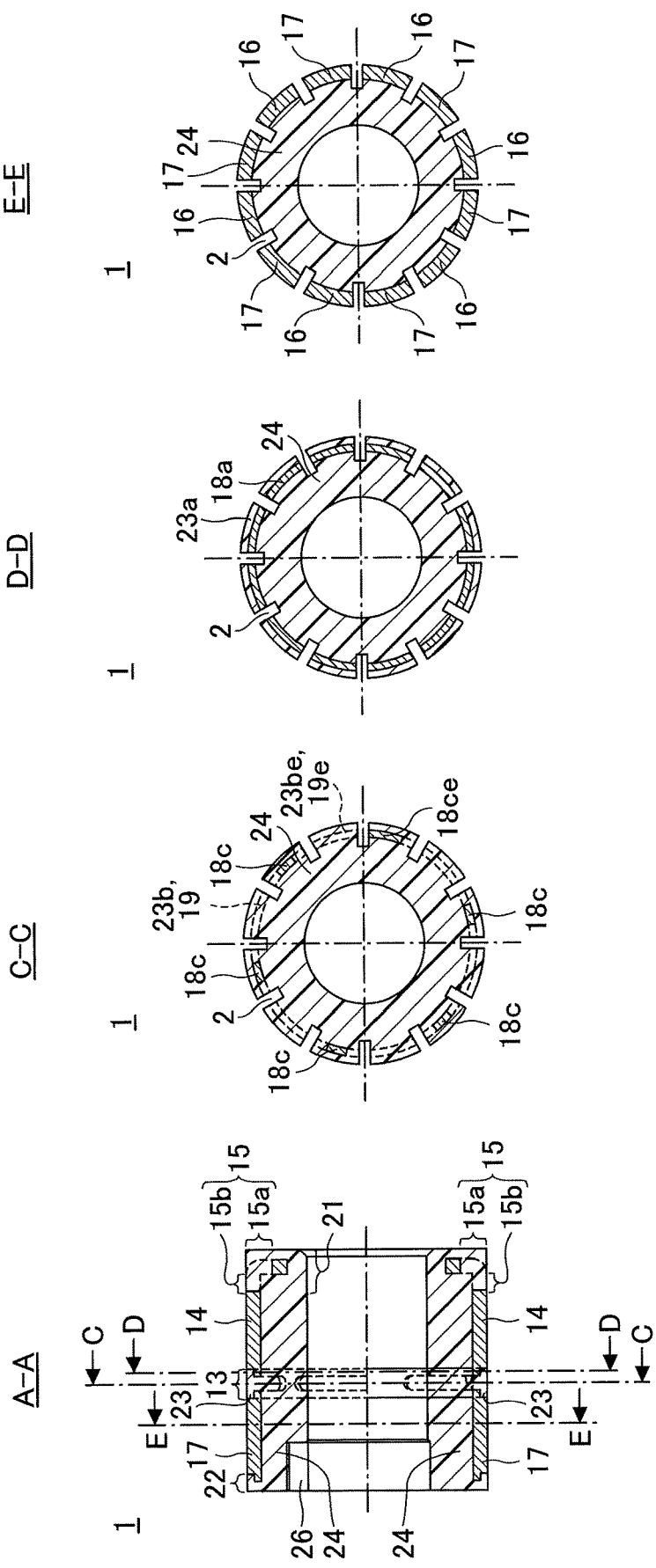

SLIP RING, ROTATION SENSOR DEVICE HAVING SLIP RING, AND METHOD OF MANUFACTURING SLIP RING

CROSS-REFERENCE TO RELATED APPLICATION

This application is a continuation application of International Application No. PCT/JP2017/035861 filed on Oct. 2, 2017 and designated the U.S., which is based upon and claims the benefit of priority of the prior Japanese Patent Application No. 2016-253369, filed on Dec. 27, 2016, the entire contents of which are incorporated herein by reference.

BACKGROUND OF THE INVENTION

1. Field of the Invention

The embodiments discussed herein relate to a slip ring, a rotation sensor device having the slip ring, and a method of manufacturing the slip ring.

2. Description of the Related Art

Generally, in rotation sensor devices (position sensors) that detect a rotational position of a rotary member that is driven and rotated by an actuator, the rotation sensor device that can cope with high temperatures may employ a contact brush type slip ring.

In the contact brush type slip ring, power and signals are transferred by a metal part arranged on a detection ring, and a brush (piece) that makes sliding contact with the detection ring. For example, as an example of the slip ring (detection rotor), Japanese Laid-Open Patent Publication No. 2001-167666 proposes a rotor illustrated in FIG. 1.

In a configuration illustrated in FIG. 1, a rotor 95 is formed by a cylindrical part 96 made of a resin, and a code member 97 made of a conductive material and provided on a cylindrical surface of the cylindrical part 96. The code member 97 has a common pattern 97a of a terminal part, and a comb-shaped code pattern 97b, mounted on an outer cylindrical surface of the cylindrical part 96, and a concavo-convex part 96a for clicking is formed on the outer cylindrical surface of the cylindrical part 96. The common pattern 97a, the code pattern 97b, and the concavo-convex part 96a are arranged in a rotation axis direction. In addition, a shaft part 96b is provided on both end surfaces of the cylindrical part 96, and a non-circular hole (I-shaped cutout hole) 96c is formed at a central part of the shaft part 96b.

The shaft parts 96b of the rotor 95 are snap-fastened on support parts 91d of a pair of arm parts 91c, so that the rotor 95 is rotatably mounted on an insulation base 91. In a state in which the rotor 95 is mounted on the insulation base 91, a contact part 93a of a common contact piece 93 makes contact with the common pattern 97a, a contact part 92a of a contact piece 92 makes contact with the code pattern 97b, and an elastic plate (not illustrated) makes elastic contact with the concavo-convex part 96a.

When a rotary encoder having the configuration described above operates, the rotor 95 rotates when a driving shaft (not illustrated) is rotated from an outside, in a state in which the driving shaft is inserted into the holes 96c of the rotor 95. Then, the code member 97 also rotates, and the common contact piece 93 constantly makes contact with the common pattern 97a, while the contact piece 92 alternately engages with and disengages from the common contact piece 93, to thereby generate a pulse signal between the common contact piece 93 and the contact piece 92. In addition, as the rotor 95 rotates, the elastic plate alternately engages with and disengages from the concavo-convex part 96a, to cause the rotor 95 to perform a click operation. The rotary encoder operates in the above described manner.

In the configuration illustrated in FIG. 1 described above, brushes (contact pieces 92 and 93) on the cylindrical part 96 that is made of resin, make contact with and move (under friction) on the cylindrical part 96 of the rotor 95. Accordingly, when the rotation is detected using the rotor 95 illustrated in FIG. 1 and components of the contact pieces 92 and 93 generated by the friction remain on the resin, a short-circuit may occur at a part of the cylindrical part 96 other than the code member 97 and cause an erroneous detection, to thereby accelerate deterioration in a detection accuracy of the rotational position of the rotor 95.

In addition, because the rotor 95 is manufactured by fitting the code member 97 that is made of a metal onto the cylindrical part 96 that is made of the resin, there is a possibility that peeling of the metal part may occur due to a centrifugal force of the rotor 95 when the rotor 95 is used repeatedly.

SUMMARY OF THE INVENTION

Accordingly, it is an object in one aspect of the embodiments to provide a slip ring that can prevent deterioration caused the brush contact and the centrifugal force, to extend a serviceable life of the slip ring.

According to one aspect of the embodiments, a slip ring for use in a slip ring brush type rotation sensor device, includes a metal ring having a cylindrical or approximately cylindrical shape, and a resin ring that supports the metal ring, wherein 2×n slits, extending in an axial direction, are formed in respective side surfaces on outer peripheries of the metal ring and the resin ring, where n is a positive number greater than or equal to 2, wherein the metal ring includes a common part formed on a side surface at one end along the axial direction of the cylindrical or approximately cylindrical shape and segmented by the slits into 2×n segments to form 2×n common regions, so that adjacent common regions are electrically connectable to each other, and a detection part formed on a side surface at the other end along the axial direction of the cylindrical or approximately cylindrical shape and segmented by the slits into 2×n segments to form n conducting regions that are electrically connectable to the common regions, and n isolated regions that are isolated from and not electrically connectable to the common regions, wherein the conducting regions and the isolated regions are alternately provided with the slit interposed between adjacent conducting region and isolated region.

Other objects and further features of the present invention will be apparent from the following detailed description when read in conjunction with the accompanying drawings.

BRIEF DESCRIPTION OF THE DRAWINGS

FIGS. 5A, 5B, 5C, 5D, 5E, and 5F are diagrams for explaining the manufacturing steps illustrated in FIG. 4;

FIGS. 8A, 8B, 8C, and 8D are diagrams for explaining only a metal part of the detection rotor;

FIGS. 11A, 11B, 11C, and 11D are diagrams illustrating the detection rotor;

DESCRIPTION OF THE PREFERRED EMBODIMENTS

Figure 1:
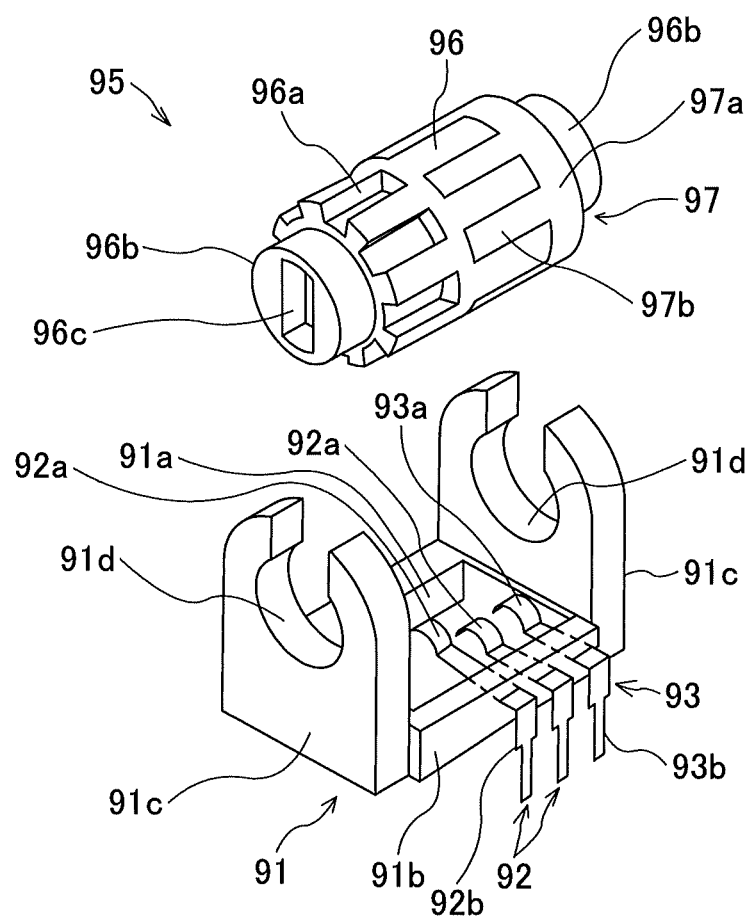
FIG. 1 is a perspective view illustrating a conventional sensor for detection.

Embodiments of the present invention will be described by referring to the drawings. In the drawings, those parts that are the same are designated by the same reference numerals, and a repeated description of the same parts may be omitted.

<Rotation Sensor Device>

Figure 2:
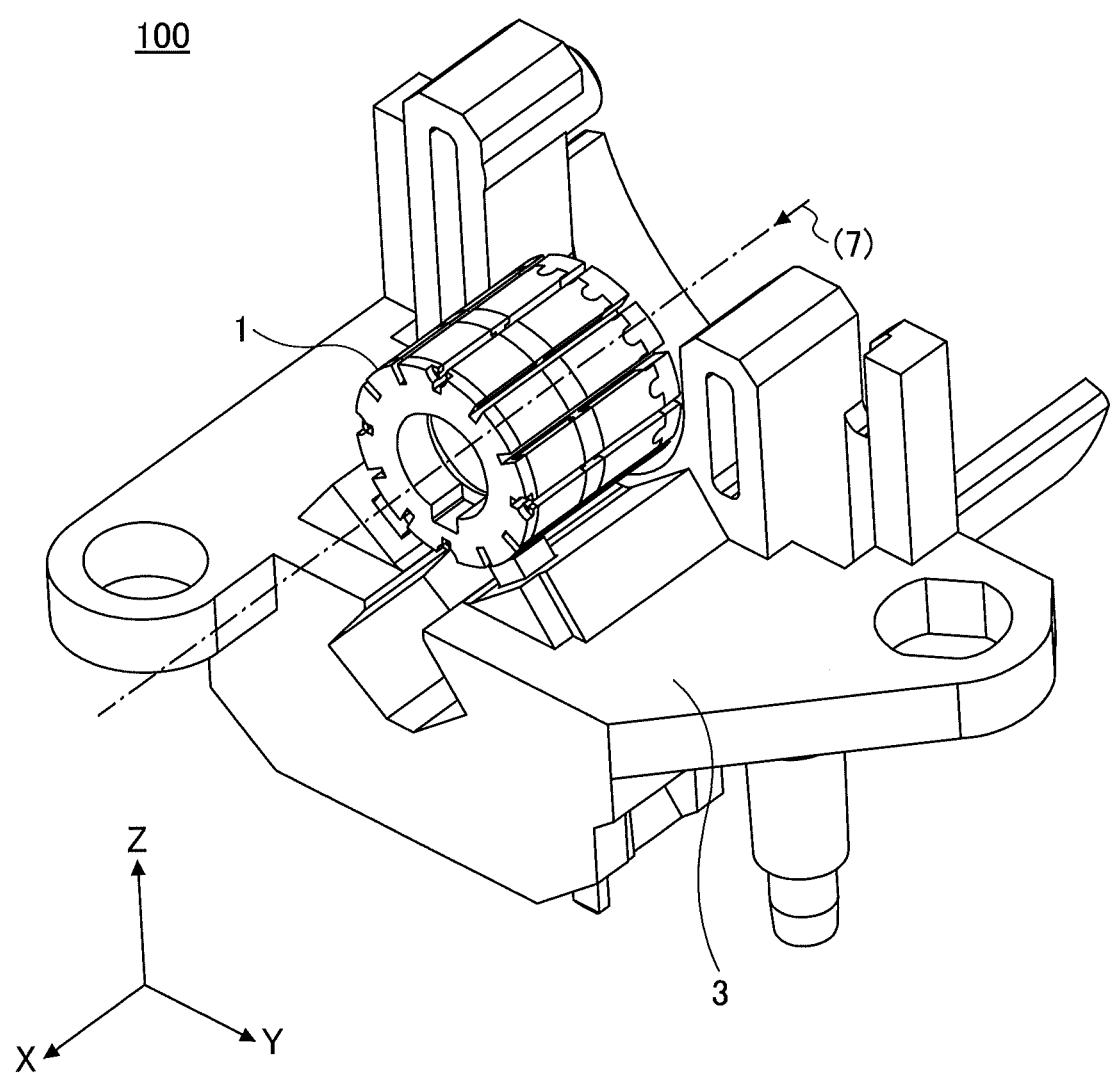
FIG. 2 is a diagram illustrating a general view of a rotation sensor device in which a detection rotor is mounted on a brush holder in one embodiment of the present invention.

First, a rotation sensor device in one embodiment of the present invention will be described by referring to FIG. 2. FIG. 2 is a diagram illustrating a general view of a rotation sensor device 100 in which a detection rotor 1 is mounted on a brush holder 3 in one embodiment of the present invention.

Figure 13:
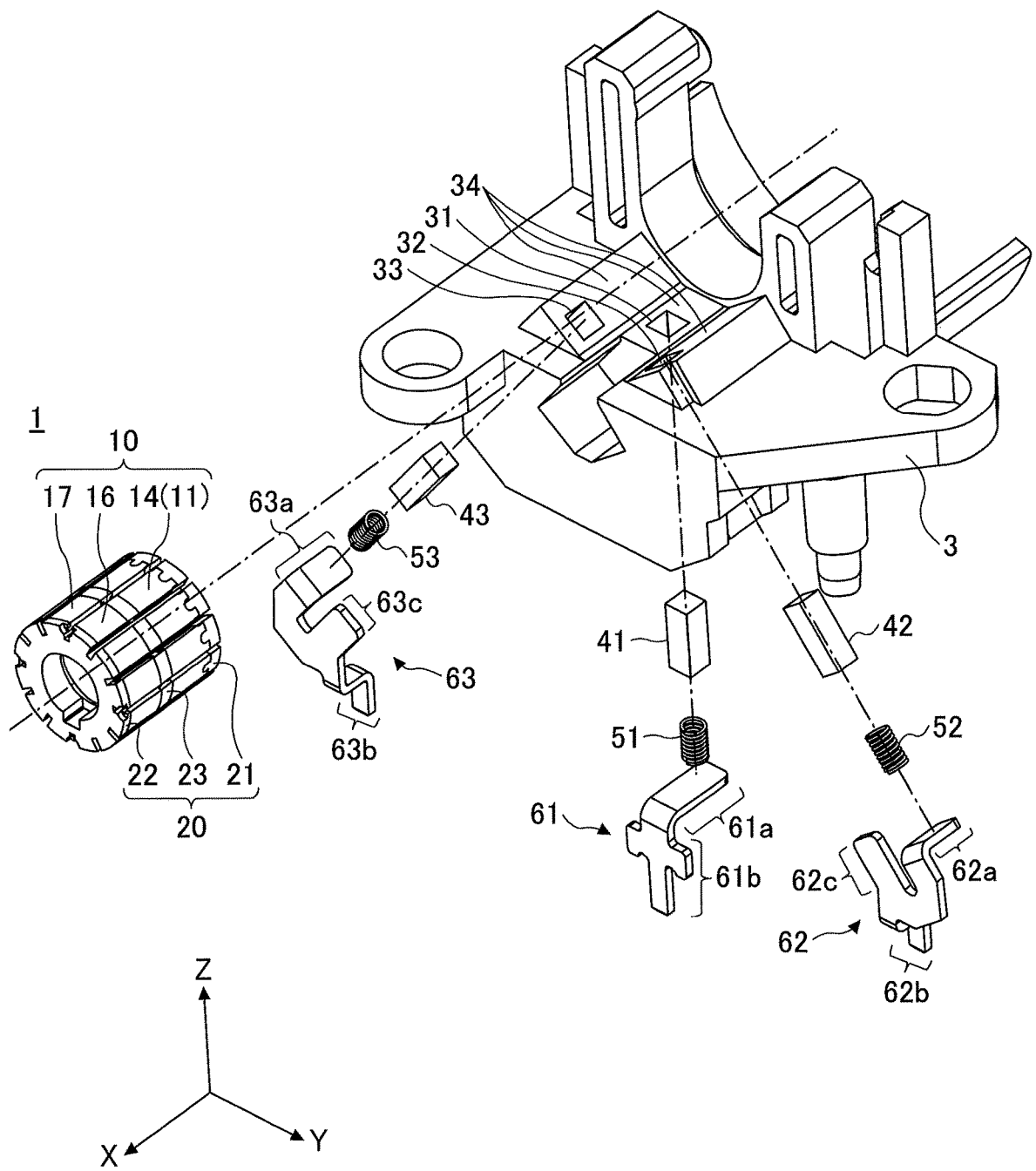
FIG. 13 is a disassembled view illustrating the rotation sensor device illustrated in FIG. 2.

The rotation sensor device 100 illustrated in FIG. 2 is a slip ring brush type rotation sensor device, and includes the detection rotor 1, and the brush holder (base member) 3 provided with brushes 41 through 43 (refer to FIG. 13).

In the rotation sensor device 100, a driving shaft 7 of a rotary member or an actuator is connected to the detection rotor 1, to detect rotation of the rotary member or the actuator. The rotary member having the shaft 7 is a motor, a gear, a roller, or a rotary on-off valve. The actuator is a rotary driving member that drives the rotary member by a motor or the like.

More particularly, the driving shaft 7 of the actuator that is interlocked to some kind of a rotary member, or the driving shaft 7 of the rotary member, is inserted (fitted) into an inside of a hollow part of a cylindrical shape or an approximately cylindrical shape of the detection rotor 1 that is an example of a slip ring. The detection rotor 1 undergoes interlocking rotation with the driving shaft 7.

In the rotation sensor device 100, the detection rotor 1 rotates, and the brushes 41 through 43 (refer to FIG. 13) contacting the detection rotor 1 detects a rotational position and a rotation amount of the detection rotor 1. A circuit board (not illustrated) of the rotation sensor device 100 acquires information of the rotational position and the rotation amount of the detection rotor 1 that is interlocked to the driving shaft 7.

For example, in a case in which a rotary on-off valve, having the actuator provided inside the valve as the rotary member, is to be driven and rotated, the rotary on-off valve is opened or closed to a predetermined angle when an external input signal becomes a predetermined threshold value (updating the rotational position is instructed) in the circuit board.

The brush holder 3 is formed by an insulation material, such as a resin or the like, for example, that does not contribute to detection of a conductive state.

<Summary of Detection Rotor>

Figure 3:
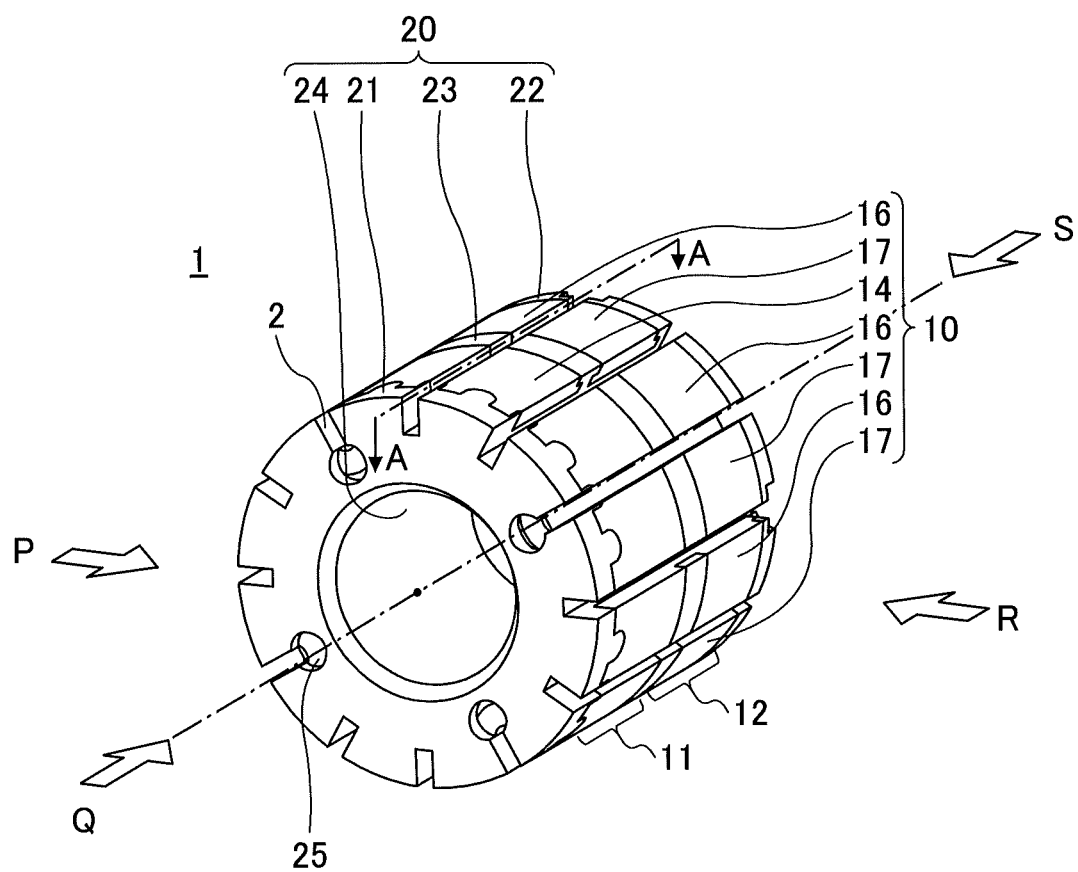
FIG. 3 is a diagram illustrating an external shape of the detection rotor (slip ring)

FIG. 3 is a diagram illustrating an external shape of the detection rotor. As illustrated in FIG. 3, the detection rotor 1 includes a metal ring 10 and a resin ring 20.

The metal ring 10 is the part that makes contact with the brush, and the resin ring 20 is the part that fixedly supports the metal ring 10.

The detection rotor 1 has 12 slits 2 that are formed to traverse both the metal ring 10 and the resin ring 20 and extend in an axial direction (lengthwise direction, ±X direction in FIG. 3).

In the metal ring 10, a side surface at one end (−X direction, front side in FIG. 3) along the axial direction of detection rotor 1 having the cylindrical or approximately cylindrical shape (hereinafter simply referred to as "approximately cylindrical shape") forms a common part 11, and a side surface at the other end (+X direction, depth side in FIG. 3) forms a detection part 12.

In the common part 11 of the side surface at one end (−X side) along the axial direction of the detection rotor 1, 12 metal regions (segments) segmented by the slits 2 are formed by 12 metal regions (common regions 14), and adjacent metal regions (common regions 14) may electrically connect with each other.

In the detection part 12 of the side surface at the other end (+X side) along the axial direction of the detection rotor 1, 12 metal regions segmented by the slits 2 are formed by 6 conducting regions 16 that are electrically connectable to the common region 14, and 6 isolated regions 17 that are isolated from the common regions 14 and are not electrically connectable to the common regions 14. In the detection part 12, the conducting region 16 and the isolated region 17 are alternately provided to sandwich the slit 2 between the adjacent conducting region 16 and isolated region 17.

On the other hand, in the resin ring 20, a side surface at one end (−X direction, front side in FIG. 3) along the axial direction of detection rotor 1 having the approximately cylindrical shape forms a common end resin part (bottom surface resin part) 21, a side surface at the other end (+X direction, depth side in FIG. 3) forms a detection end resin part (bottom surface resin part) 22, and a central part along the axial direction forms a central resin part 23. Further, the resin ring 20 includes an inner ring resin part 24 on an inner periphery of the metal ring 10.

Hence, the resin ring 20 includes the inner resin part 24 covering the entire inner peripheral side surface of the cylindrical or approximately cylindrical shape of the metal ring 10, bottom surface resin parts 21 and 22 covering the entire bottom surfaces at the one end and the other end of the cylindrical or approximately cylindrical shape of the metal ring 10 from both ends, and a central resin part 23 located on the outer peripheral surface of the cylindrical or approximately cylindrical shape of the metal ring 10, between the common part 11 and the detection part 12, to form a part of the side surface of the detection rotor 1 that is an example of the slip ring.

In addition, common end mold holes 25 illustrated on the front side of FIG. 3 are formed in a common end resin part 21.

<Manufacturing Steps of Detection Rotor>

Figure 4:
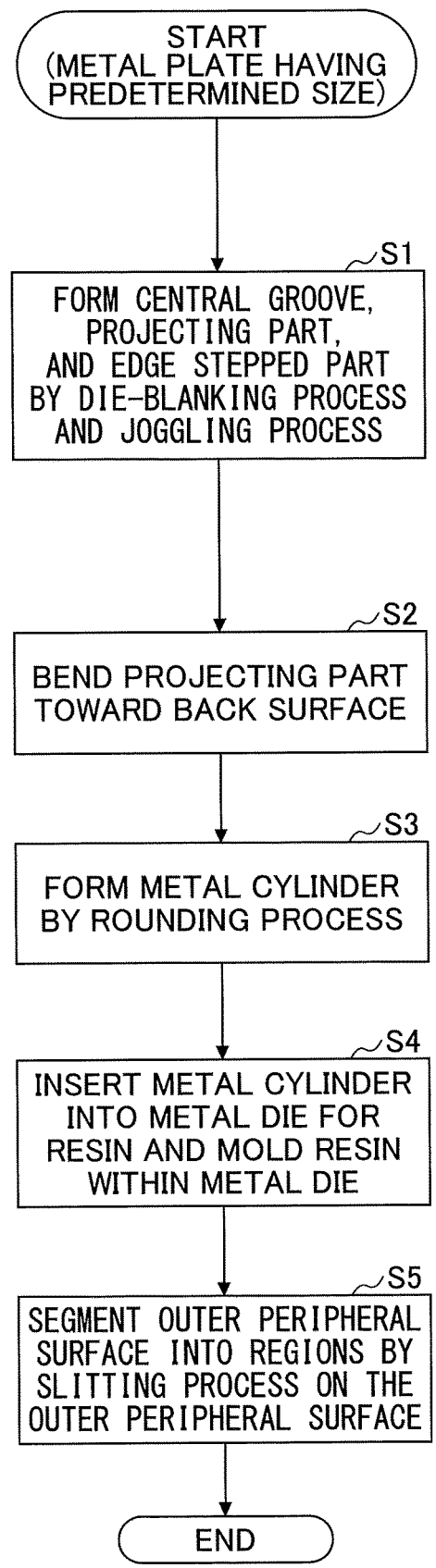
FIG. 4 is a flow chart illustrating manufacturing steps of the detection rotor.

Next, a method of manufacturing the detection rotor 1 will be described, by referring to FIG. 4 and FIGS. 5A through 5F. FIG. 4 is a flow chart illustrating manufacturing steps of the detection rotor, and FIGS. 5A, 5B, 5C, 5D, 5E, and 5F are diagrams for explaining the manufacturing steps illustrated in FIG. 4.

First, the flowchart is started using a metal plate M having a predetermined size and an approximately rectangular shape (refer to FIG. 5A).

Step S1: Joggling and Die-Blanking Processes

A joggling process and a die-blanking process are performed, to form a central groove (recess) part 13, a projecting part 15x located at an edge part of one of long sides, and an end thinned part 12t located at an edge part of the other of the long sides, as illustrated in FIG. 5B.

More particularly, a central thinned part 18 is formed at a central part of a short side of the approximately rectangular metal plate M, by the joggling process. The central thinned part 18 is a dent of the central groove part 13, that is dented from a first surface s1 by a predetermined depth and a predetermined width, to extend parallel to the long sides. 6 through-holes (elongated holes) 19 and 19e are intermittently formed in the central groove part 13 to penetrate to a second surface s2, by the die-blanking process. The 6 elongated through-holes 19 and 19e penetrate the metal plate M from the first surface s1 to the second surface s2 opposite to the first surface s1.

Although the illustrated example of the through-hole (elongated hole) 19 has an oval shape having a curvature at an edge part, the through-hole 19 may have a rectangular shape. In addition, as illustrated in FIG. 5B, the through-hole 19e opening at the end part of one of the long sides of the approximately rectangular shape does not necessarily need to have a curvature.

In addition, the die-blanking process is performed so that 11 semi-oval ring-shaped (annular) projecting parts (tongues) 15x having semi-circular tip ends (rounded tip ends) project together from a predetermined region, with respect to the edge part of one of the long sides.

In this example, 11 semi-oval ring-shaped projecting parts are formed as the projecting parts 15x. However, after forming 11 projecting parts, 2¼-oval-shaped rings may be formed on both ends along the lengthwise direction, and after a rounding process that is performed at a later stage, the 2¼-oval-shaped rings may be made adjacent to each other at a joint part J to form the ring shape.

The joggling process is performed with respect to the other edge part of the long side where the plurality of projecting parts 15x are not formed, to form the end thinned part 12t having a reduced thickness by being dented from the first surface s1.

Step S2: Bending Process

The 11 semi-oval ring-shaped projecting parts 15x are bent (folded) toward the second surface s2 (downward in FIG. 5C), as illustrated in FIG. 5C. Because the projecting part 15x is bent at an intermediate part thereof, a projecting bent part (region bridging part) 15 having a bent part 15a extending approximately downward, and a stress relaxation part 15b at a root of the bent part 15a, is formed.

In this example, the semi-oval ring-shaped (annular) projecting part 15x has an opening, so that in the rounding process of step S3 performed at a later stage, the outer periphery assumes a shape as close as possible to a perfect circle, including the root of the bent part 15a. However, the semi-oval ring-shaped projecting part 15x does not necessarily need to have an opening.

An external shape of the projecting part 15x may be a shape other than the oval shape (a shape that is a combination of a rectangle and a semi-circle). However, in order to avoid adjacent bent parts 15a from overlapping each other even at a stage after the rounding process of step S3, the adjacent projecting parts 15x are preferably arranged to be separated from each other by a predetermined distance.

Step S3: Rounding Process

The long sides of the rectangular metal plate, subjected to the die-blanking process, the joggling process, and the bending process of steps S1 and S2, are rounded to join the short sides to each other at the joint part J. Hence, the rectangular metal plate is rounded into the approximately cylindrical shape, as illustrated in FIG. 5D.

In FIG. 4, the die-blanking process, the joggling process, and the bending process are performed using the metal plate M having the predetermined size, at the start of the process. However, the metal plate that is used may be extended on a work table by drawing out an end of a reel-shaped hoop material that is continuous along a longitudinal direction, to perform the processes on the continuous metal plate. In this case, the continuous metal plate is cut into predetermined sizes after performing the die-blanking process and the joggling process of step S1 and the bending process of step S2, and the metal plate having the predetermined size is rounded into the approximately cylindrical shape by the rounding process of step S3.

Step S4: Molding Process

In a molding process, a resin in liquid form or melted solid is poured into a metal die (for example, a metal die 80 illustrated in FIG. 6) having a cylindrical projection (for example, a central projection 82 illustrated in FIG. 6) at a center thereof. The resin is an epoxy resin, a phenol resin, or the like. The poured resin is solidified into a predetermined shape. Hence, the rounded metal having the approximately cylindrical shape is molded with the resin, to become as illustrated in FIG. 5E.

Figure 6:
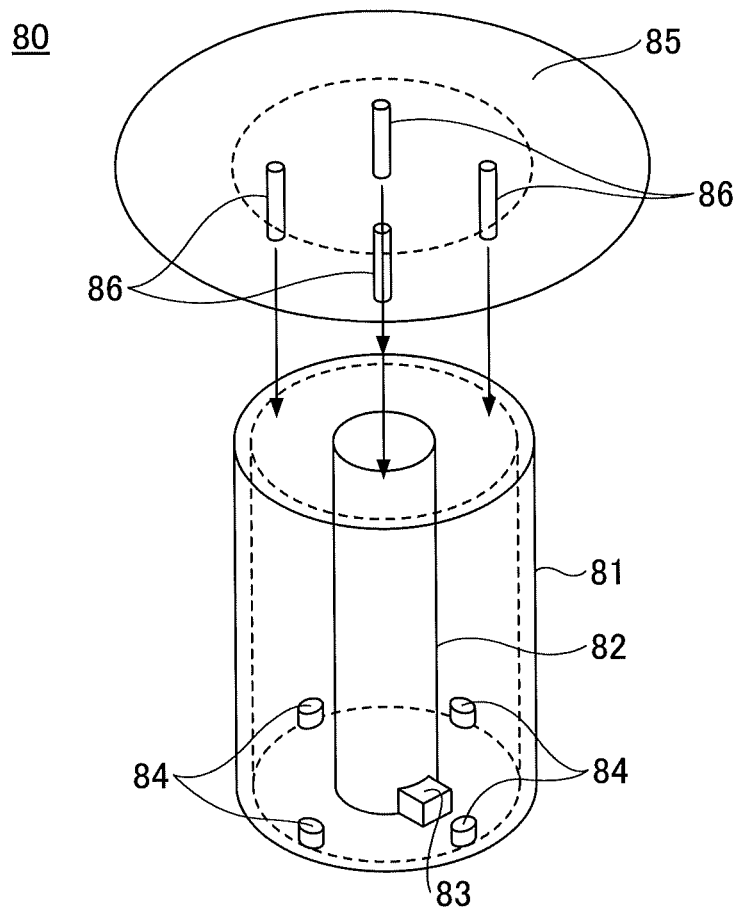
FIG. 6 is a diagram for explaining an example of a metal die that is used in a molding step included in the manufacturing steps of the detection rotor.

More particularly, the molding process included in the manufacturing process of the detection rotor 1 will be described with reference to FIG. 6 and FIG. 7. FIG. 6 is a diagram for explaining an example of a metal die that is used in the molding step S4, and FIG. 7 is a diagram for explaining a state in which a metal cylinder is inserted into the metal die.

As illustrated in FIG. 6, the metal die 80 used in the molding process is formed by a metal die fixed end 81, and a metal die movable end 85. The central projection 82, a positioning projection 83, and lower support legs 84 are provided in the metal die fixed end 81. Metal die movable end support parts 86 are provided on the metal die movable end 85. In this example, the central projection 82 for forming a hollow part at the center of the resin is integrally formed on the metal die fixed end 81, however, the central projection 82 may be integrally formed on the metal die movable end 85.

Figure 7:
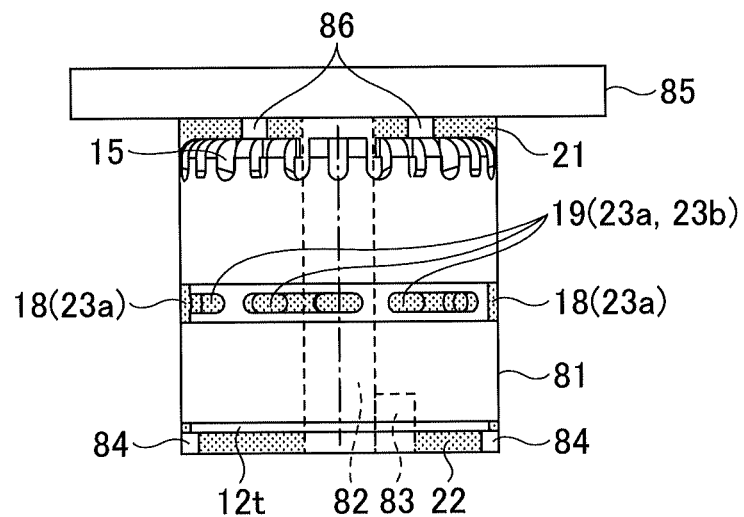
FIG. 7 is a diagram for explaining a state in which a metal cylinder is inserted into the metal die illustrated in FIG. 6 in the molding step.

As illustrated in FIG. 7, the resin between the inner peripheral surface of the metal having the approximately cylindrical shape and the cylindrical, central projection 82 forms the inner ring resin part 24. The inner ring resin part 24 is formed so as to cover the entire inner peripheral side surface of the approximately cylindrical shape (surface corresponding to the second surface of the metal plate).

The resin between a lower end of the metal having the approximately cylindrical shape and a bottom of the metal die 80 forms the detection end resin part 22 on the side of the detection part 12. The detection end resin part 22 is formed so as to cover the metal having the approximately cylindrical shape by an annular shape having a predetermined width from the lower end of the metal having the approximately cylindrical shape, excluding the part of the central projection 82. In this state, in order to form the detection end resin part 22 with a predetermined thickness, the lower support legs 84 support the lower surface of the metal having the approximately cylindrical shape. Parts corresponding to the lower support legs 84 become cavities forming detection end mold recesses 27 of the detection end resin part 22 (refer to FIG. 9D). In addition, the resin enters, from below, between the end thinned part 12t located under the metal having the approximately cylindrical shape and an inner peripheral surface of the metal die fixed end 81.

The resin above the metal having the approximately cylindrical shape in FIG. 7 forms the common end resin part 21 on the side of the common part 11. The common end resin part 21 is formed so as to cover the upper surface of the metal having the approximately cylindrical shape by an annular shape having a predetermined width from the upper end of the metal having the approximately cylindrical shape, excluding the part of the central projection 82. In this state, in order to form the common end resin part 21 with a predetermined thickness, the metal die movable support parts 86 support the metal die movable end 85 that forms a lid member. Parts corresponding to the metal die movable support parts 86 become the common end mold holes 25 that communicate at the metal, bent part 15a, in the common end resin part 21 (refer to FIG. 9B).

Because the melted resin is used as illustrated in FIG. 7, the resin enters from the through-holes 19 in the metal having the approximately cylindrical shape towards the outer side as indicated by dotted-line arrows in FIG. 5D when forming the inner ring resin part 24. Hence, the central groove part 13 is filled by the resin, to form the central resin part 23. The central groove part 13 (18 and 19) of the metal having the approximately cylindrical shape is filled by the central resin part 13. More particularly, as indicated by the dotted-line arrows in FIG. 5D, the resin passes through the through-holes 19 and spreads towards the outer side of the central thinned part 18, and the central groove part 13 is filled as illustrated in FIG. 5E to form the central resin part 23. Details of the resin (central resin part 23) in the central groove part 13 will be described later in conjunction with FIGS. 10A and 10B, and FIGS. 8A through 8D.

Accordingly, the metal having the approximately cylindrical shape is fixed by the resins, namely, the inner ring resin part 24, the detection end resin part 22, the common end resin part 21, and the central resin part 23.

Step S5: Slitting Process 12 slits 2 are formed in an outer peripheral surface of the rounded metal having the approximately cylindrical shape and an outer peripheral surface of the molded resin, as illustrated in FIG. 5F.

By forming the slits 2 in the outer periphery of the detection rotor 1, one end (front side in FIG. 5F) of the outer peripheral surface of the cylindrical shape of the metal ring 10 becomes the common part 11 having 12 common regions 14. In addition, the other end (depth side in FIG. 5F) of the outer peripheral surface of the cylindrical shape of the metal ring 10 becomes the detection part 12. In the detection part 12, the conducting regions 16 that are electrically connectable to the common part 11, and the isolated regions 17 that are isolated from the common regions 14 and not electrically connectable to the common regions 14, are alternately arranged.

The processes of steps S1 through S5 described above utilize a method of manufacturing a commutator of a general motor. Hence, the detection rotor in one embodiment of the present invention can be manufactured using the facilities for manufacturing the commutator.

(Configuration of Detection Rotor)

Details of the configuration of the detection rotor 1 will be described by referring to FIG. 8A through FIG. 12.

FIGS. 8A through 8D are diagrams for explaining only a metal part of the detection rotor 1. FIG. 8A is a side view of the metal ring 10, that is an arrow view in a direction of an arrow P in FIG. 3, FIG. 8B is an end view of the common end, that is an arrow view in a direction of an arrow Q, FIG. 8C is a side view including the joint part, that is an arrow view in a direction of an arrow R, and FIG. 8D is an end view of the detection end, that is an arrow view in a direction of an arrow S.

Figure 9A:
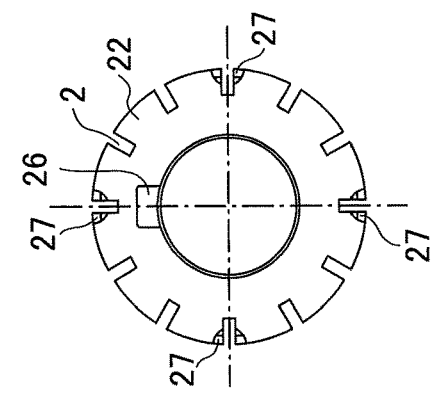
FIGS. 9A, 9B, 9C, and 9D are diagrams for explaining only a resin part of the detection rotor.
Figure 9B:
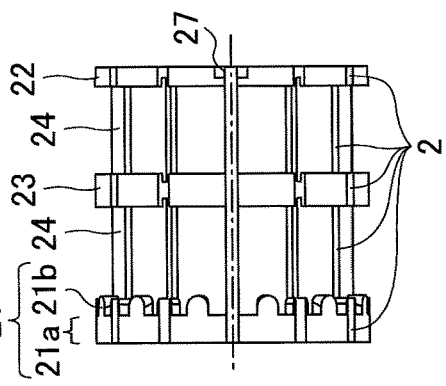
Figure 9C:
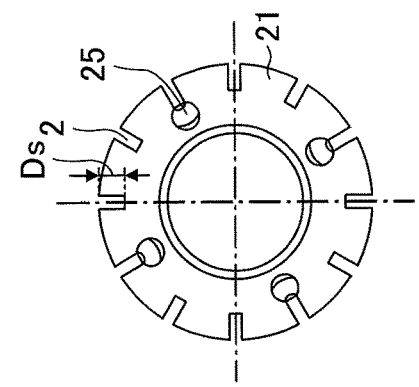
Figure 9D:
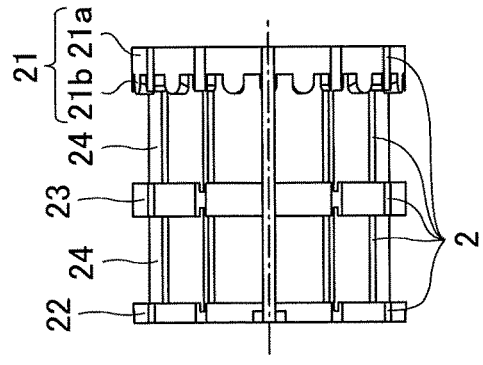

FIGS. 9A through 9D are diagrams for explaining only a resin part of the detection rotor 1. FIG. 9A is a side view of the resin ring 20, that is an arrow view in the direction of the arrow P in FIG. 3, FIG. 9B is an end view of the common end, that is an arrow view in the direction of the arrow Q, FIG. 9C is a side view, including the joint part, that is an arrow view in the direction of the arrow R, and FIG. 9D is an end view of the detection end, that is an arrow view in the direction of the arrow S.

Figure 10A:
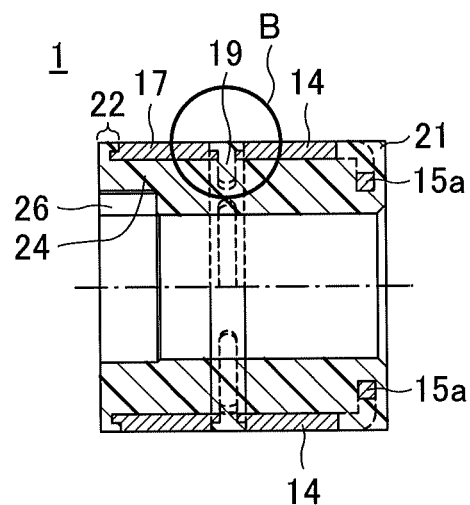
FIGS. 10A and 10B are diagrams respectively illustrating the detection rotor.
Figure 10B:
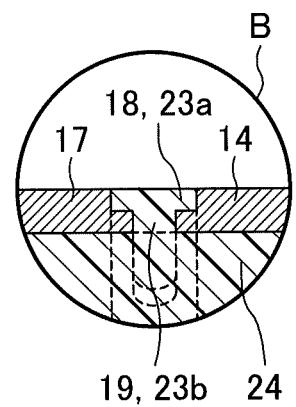

FIGS. 10A and 10B are diagrams respectively illustrating the detection rotor 1. FIG. 10A illustrates a transverse sectional view of a plane A in FIG. 3, and FIG. 10B illustrates an enlarged view of the central groove part within an encircled part in FIG. 10A.

FIGS. 11A through 11D are diagrams illustrating the detection rotor. FIG. 11A illustrates a transverse sectional view of the plane A in FIG. 3, FIG. 11B illustrates a longitudinal sectional view of a plane C-C in FIG. 11A, FIG. 11C illustrates a longitudinal sectional view of a plane D-D in FIG. 11A, and FIG. 11D illustrates a longitudinal sectional view of a plane E-E in FIG. 11A.

As illustrated in FIGS. 8A through 8D, the common part 11, including the common regions of the 12 metal regions, is provided on the −X end of the metal ring 10 where the projecting bent parts 15 having the oval ring shape are provided. More particularly, as illustrated in FIG. 8B and FIG. 8D, 11 projecting bent parts 15 are provided at the edge part of the side surface at one end of the common regions 14 of the metal ring 10, and the projecting bent parts 15 are bent so as to project in an inner radial direction of the approximately cylindrical shape. The 11 projecting bent parts 15 electrically connect the adjacent metal regions at the common part 11, without being segmented by the slits.

The projecting bent part 15 has the semi-oval ring-shaped projecting part 15x that is bent to project in the inner radial direction of the approximately cylindrical shape, to include the bent part 15a (refer to FIG. 5D).

In order to reduce effects of bending on the planar metal plate (refer to FIG. 5B), the projecting bent part 15 includes 2 rod-shaped strain relaxation parts 15b, having the same thickness as the bent part 15a that is ring-shaped at a tip end thereof, provided at the root of the bent part 15a.

On the other hand, the common part 11 and the detection part 12 are connected by a metal groove connecting part 18c, at parts of the metal part on the end where the projecting bent parts 15 are not formed and the through-holes 19 are interrupted. These parts of the metal part become the conducting regions (electrode regions) 16 that are electrically connectable to the common regions 14. Signals detected by the conducting regions 16 have the same potential as the common regions 14.

The common part 11 and the detection part 12 are not connected by the metal at parts of the metal part on the end where the projecting bent parts 15 are not formed, that is, at these parts of the metal part where the through-holes 19 are stretched. Hence, these parts of the metal part become the isolated regions 17 that cannot electrically connected to the common regions 14. Signals detected by the isolated regions 17 have a potential different from the potential of the common regions 14.

A projecting length (height) Lp of the bent part 15a of the projecting bent part 15 is set longer than a cut depth Ds of the slit 2 illustrated in FIG. 9B.

In addition, as illustrated in FIG. 8D, a thickness Wp of the bent part 15a of the projecting bent part 15 at the common part 11 is set greater than a cut width Ws of the slits 2.

By setting the projecting length and the thickness dimensions of the bent part 15a in the above described manner, the bent part 15a can maintain the conducting state at the same potential by bridging the electrical signal (voltage or the like) between the adjacent common regions 14. Hence, the bent part 15a functions as a region bridging part that bridges the conducting state (electrical signal).

On the other hand, the detection part 12, including the conducting regions 16 and the isolated regions 17, is provided on the +X end of the metal ring 10 illustrated in FIGS. 8A through 8D where the projecting bent parts 15 are not provided. The conducting regions 16 that are electrically connectable to the common part 11, and the isolated regions 17 that are not electrically connectable to the common part 11, are alternately arranged.

At the end part on the +X end of the detection part 12, the end thinned part 12t (refer to FIG. 5B) having a reduced thickness compared to other parts of the cylindrical shape by being dented from the outer side by the joggling process, is segmented by the slits 2 to form end thinned parts 16t and 17t.

(Resin Part)

As illustrated in FIGS. 9A through 9D, the resin ring 20 is provided with the inner ring resin part 24, the detection end resin part 22, the common end resin part 21, and the central resin part 23.

As illustrated in FIG. 9B, the common end mold holes 25 are formed in the common end resin part 21 at parts corresponding to the locations where the metal die movable end support parts 86 (refer to FIG. 6) were provided in the metal die when molding the resin.

As illustrated in FIG. 9D, the driving shaft 7 (refer to FIG. 2) of the rotary member or the actuator, and a positioning recess 26 for positioning purposes are provided in the detection end resin part 22. In addition, the detection end mold recesses 27 are formed in the detection end resin part at parts corresponding to the locations where the lower support legs 84 (refer to FIG. 6) were provided when molding the resin.

As described above, the isolated regions 17 of the metal ring after forming the slits 2 are isolated from other metal regions. Hence, the inner ring resin part 24, the detection end resin part 22, and the central resin part 23 are integrally molded to surround the isolated regions 17.

More particularly, as illustrated in the transverse sectional view of FIG. 10A and the enlarged view of FIG. 10B, the resin is buried in a T-shape in the central groove part 13.

When viewed from another angle, as illustrated in the cross section of the plane C-C in FIG. 11C, at the second layer from the outermost periphery, the metal remains only in the groove connecting parts 18c and 18ce, and parts of the through-holes 19 and 19e are filled by a communicating resin part 23b.

On the other hand, as illustrated in the cross section of the plane D-D in FIG. 11C, a common end thinned part 18a of the central thinned part 18 is provided at all of the groove parts in the periphery of the through-holes 19, and a central outer resin part 23a is provided on the outermost peripheral surface. In other words, the resin sandwiches the metal part between the outer periphery and the inner periphery of the cylindrical shape.

Accordingly, in the central resin part 23, the central outer resin part 23a overhangs and is fixed on the parts (outer side of the outer periphery) of the common end thinned part 18a and a detection end thinned part 18b at the peripheral parts of the through-holes 19 and 19e. Hence, the resin (23a and 23b) sandwiches the metal part (common end thinned part 18a, detection end thinned part 18b, and groove connecting part 18c forming the central thinned part 18) at the central part of the cylindrical shape.

In addition, in the cross section of the plane E-E in FIG. 11D, the outermost peripheral surface is the metal detection part 12. Similarly as in the case of FIG. 11D that illustrates the cross section of the detection part 12, in the case of the cross section of the common part 11, the outermost peripheral surface is the metal common part 11.

Further, in FIG. 11A, the outermost peripheral surfaces of the end thinned parts 16t and 17t are similarly covered by the detection end resin part 22 from the outer side along the end direction. Hence, the metal is sandwiched by the resin at the end part of the detection part 12.

In FIG. 11A, the outer side along the outer peripheral direction of the bent part 15a of the projecting bent part 15 having the opening is covered by the common end resin part 21 from the outer side along the end direction. Hence, the metal is sandwiched by the resin, also at the end part of the common part 11.

Accordingly, the metal is sandwiched by the resin at 3 points, namely, the central part and both end parts along the rotation axis direction of the detection rotor 1. For this reason, even when the centrifugal force acts when rotating the detection rotor 1, it is possible to prevent peeling of the metal part from the resin part.

As illustrated in the cross section of the plane C-C in FIG. 11B and the cross section of the plane E-E in FIG. 11D, in the detection part 12 that is segmented by the slits 2, the second layer from the outermost periphery becomes the conducting regions 16 at parts where the metal parts (groove connecting parts) 18c and 18ce remain and at corresponding parts along the axial direction, and becomes the isolated regions 17 at parts corresponding to regions where no metal parts 18c and 18ce exist. In other words, at the outer peripheral surface of the detection part 12 of the detection rotor 1, the conducting regions 16 and the isolated regions 17 that have different properties depending on whether electrical connection is made with the metal parts 18c and 18ce are segmented by the slits 2 and alternately provided.

FIGS. 8A through 8D and FIGS. 9A through 9D respectively illustrate disassembled elements. However, in the actual driven state, the metal ring 10 and the resin ring 20 will not separate from each other.

Figure 12:
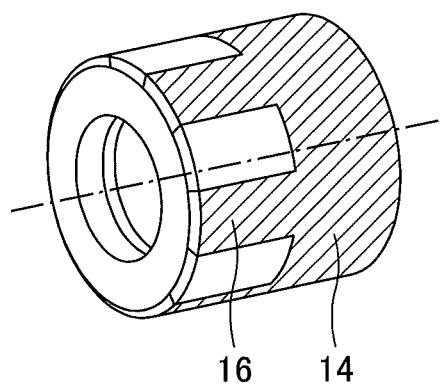
FIG. 12 is a schematic diagram illustrating a conductive state of the metal part of the detection rotor.

FIG. 12 is a schematic diagram illustrating a conductive state of the metal part of the detection rotor.

As described above, the conducting region 16 is electrically connected to the common region 14, and hence becomes an ON region for turning ON a detection signal. The isolated region 17 is isolated from and not electrically connected to the common region 14, and hence becomes an OFF region for turning OFF the detection signal.

In the described embodiments, the number of conducting regions 16 that becomes the same potential as the common regions 14, that is, the number of times the detection signal turns ON, is counted to detect the rotation amount (rotation angle) of the detection rotor 1.

FIG. 12 is a schematic diagram, and the conducting parts (common part 11+conducting region 16) are comb-shaped. But actually, unlike the conventional example illustrated in FIG. 1, the metal region (isolated region 17) is provided on the resin (inner ring resin part 24) at the part making contact with the brush, and the brush will not make direct contact with the resin. For this reason, it is possible to prevent undesirable effects of the short-circuit or the like caused by the contact between the brush and the resin.

<Rotation Sensor Device>

FIG. 13 is a disassembled view illustrating the rotation sensor device illustrated in FIG. 2. As illustrated in FIG. 13, the rotation sensor device 100 includes the slip ring 1 connected to the driving shaft 7 (refer to FIG. 2) of the rotary member of the actuator, the brushes 41, 42, and 43, springs 51, 52, and 53, terminals 61, 62, and 63, the brush holder 3, or the like.

In the slip ring brush type rotation detection, the brushes 41, 42, and 43 detect the rotation while making contact with the slip ring 1. In the configuration illustrated in FIG. 13, 3 sets of the brushes 41 through 43, the springs 51 through 53 that are brush springs, and the terminals 61 through 63 are provided inside the brush holder 3.

The springs 51, 52, and 53 push the brushes 41, 42, and 43 toward the detection rotor 1, so that the brushes 41, 42, and 43 make contact with the detection rotor 1 from under the detection rotor 1.

First ends of the terminals 61, 62, and 63 are respectively connected to the springs 51, 52, and 53, and second ends of the terminals 61, 62, and 63 are connected to an external circuit board or the like.

The terminals 61, 62, and 63 are provided inside the brush holder 3 before fitting rotor opposing surfaces 34 forming top plates of the brush holder 3. After the brush holder 3 is completed, the springs 51, 52, and 53 and the brushes 41, 42, and 43 are successively inserted through respective small holes 31, 32, and 33 provided in the rotor opposing surfaces 34.

More particularly, the terminal 62 includes a spring contacting part 62a that contacts the spring 52 located at an upper end thereof (inner side of brush holder 3), an external connection terminal part 62b that projects from the brush holder 3, and a terminal pushdown part 62c.

Similarly, the terminal 63 includes a spring contacting part 63a, an external connection terminal part 63b, and a terminal pushdown part 63c.

On the other hand, the terminal 61 includes a spring contacting part 61a and an external connection terminal part 61c, but does not include a terminal pushdown part.

Figure 14:
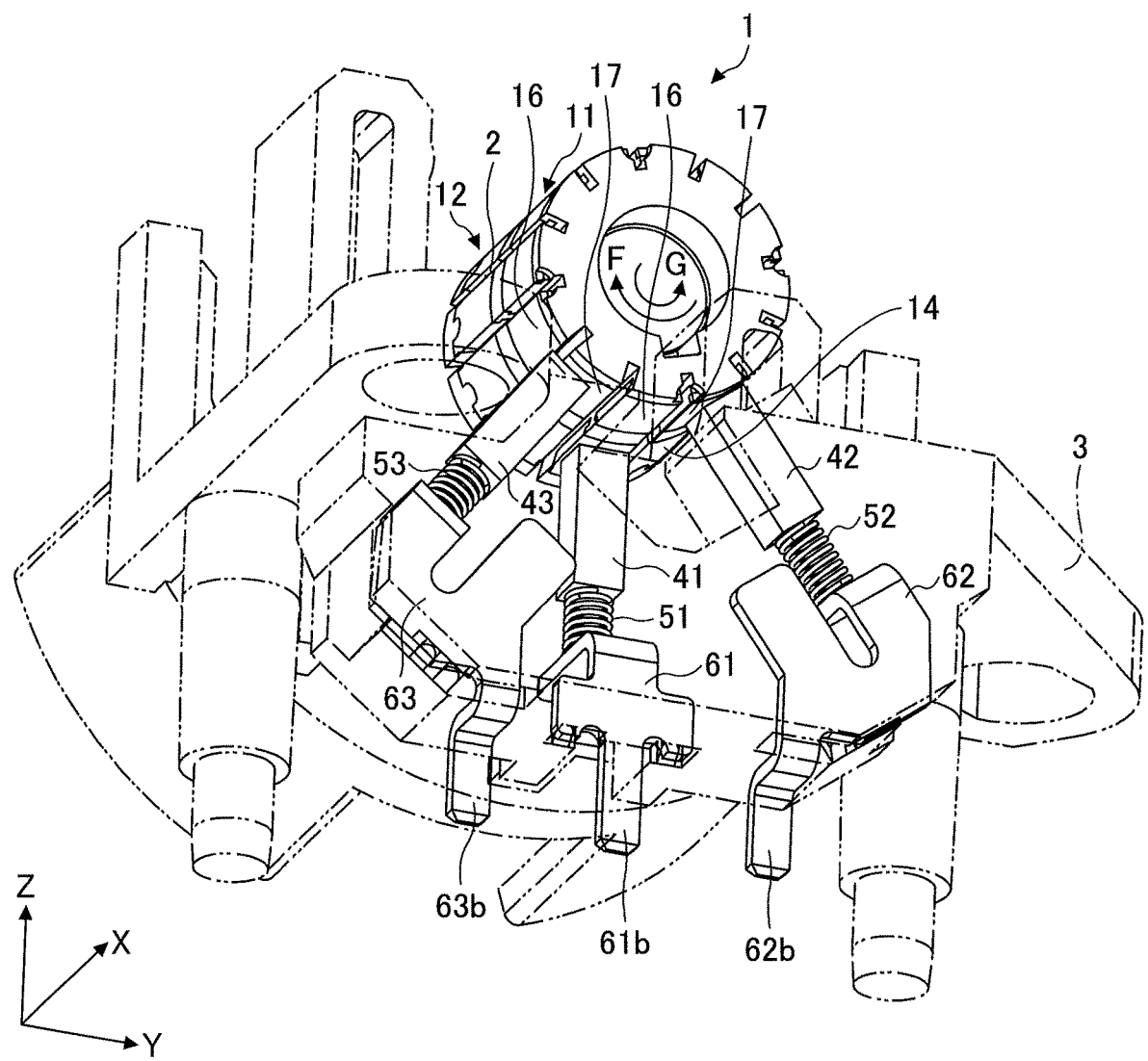
FIG. 14 is a diagram for explaining a contact state of the detection rotor and a brush in the rotation sensor device.

As illustrated in FIG. 13, among the small holes 31, 32, and 33 formed in the rotor opposing surfaces 34, the center small hole 31 opens in a direction directly below, but the small holes 32 and 33 open at inclinations in directions different from the direction directly below. On the other hand, as illustrated in FIG. 13 and FIG. 14, the external connection terminal parts 61b, 62b, and 63b that project from the brush holder 3 extend in the same direction that is directly below. For this reason, the terminals 62 and 63 that are fitted into the brush holder 3 at inclination angles are provided with the terminal pushdown parts 62c and 63c that are utilized to push down on the terminals 62 and 63 when fitting the terminals 62 and 63 into the brush holder 3.

FIG. 14 is a diagram for explaining a contact state of the detection rotor and the brush in the rotation sensor device.

The brush 41 illustrated in FIG. 13 and FIG. 14 functions as a first brush, and is arranged to oppose the common part 11 of the detection rotor (slip ring) 1. In addition, the brushes 42 and 43 function as a second brush, and are arranged to oppose the conducting region 16 and the isolated region 17 of the detection part 11.

When the detection rotor 1 forming the slip ring rotates, and the brushes 41 through 43 contacting the detection rotor 1 detects the rotational position of the detection rotor 1, a circuit connected to the fixed terminals 61, 62, and 63 acquires information including the actuator that instructs the rotation, and the rotational position and the rotation amount of the rotation rotor 1 that is interlocked to the driving shaft 7 of the rotary member or the actuator.

As described above, the outer peripheral surface of the common part 11 at the depth side in FIG. 13 is segmented by the slits 2 into the segments respectively forming the 12 common regions 14. The outer peripheral surface of the detection part 12 at the front side in FIG. 13 is segmented by the slits 2 into 6 segments respectively formed by the alternately arranged conducting region 16 and the isolation region 17.

When the brushes 42 and 43 make contact with the conducting region 16, the potential detected by the brushes 42 and 43 contacting the detection part 12 becomes the same as the potential detected by the brush 41 contacting the common part 11, and an ON detection signal is output.

On the other hand, when the brushes 42 and 43 make contact with the isolated region 17, the potential detected by the brushes 42 and 43 contacting the detection part 12 becomes different from the potential detected by the brush 41 contacting the common part 11, and an OFF detection signal is output.

Accordingly, in the rotation sensor device 100 having the configuration described above, when the brushes detect the rotation of the detection rotor while making sliding contact with the detection rotor, the ON detection signal and the OFF detection signal is output 6 times while the detection rotor makes 1 revolution. The brush 41 intermittently makes contact with the common region 14 of the common part 11, and the brushes 42 and 43 alternately make contact with the 12 conducting region 16 and the isolated region 17.

The brush 42 and the brush 43 are arranged at a predetermined angular separation with respect to the detection part 12. More particularly, in the detection rotor described above, 12 slits 2 are formed, and the regions 16 and 17 that are segmented for every 360°÷12 respectively are slightly less than 30°. Accordingly, because the conducting region 16 and the isolated region 17 are arranged for every 30° with the slit 2 interposed therebetween in the detection part 12, the conducting region 16 appears for every approximately 60°. Thus, by arranging the brushes 42 and 43 at an angular separation that is different from 60°×n (n=1 to 5), it is possible to detect whether the rotation of the detection rotor is a forward rotation or a reverse rotation.

For example, FIG. 14 illustrates an example in which the brushes 42 and 43 are arranged at an angular separation of 75°. In this example, by arranging the brushes 42 and 43 with a 75° difference in the detection positions, the ON detection signal and the OFF detection signal are output for every 30°, that is, 6 times during 1 revolution of the detection rotor. Hence, the ON detection signal and the OFF detection signals are detected at different timings corresponding to a ¼ phase difference.

For example, in a case in which the detection rotor 1 rotates clockwise as indicated by an arrow F in FIG. 14, a period of the ON detection signal is detected by the brush 42 before a period of the ON detection signal is detected by the brush 43. On the other hand, in a case in which the detection rotor 1 rotates counterclockwise as indicated by an arrow G in FIG. 14, the period of the ON detection signal is detected by the brush 43 before the period of the ON detection signal is detected by the brush 42.

Accordingly, the conducting state and the non-conducting state are detected with a timing difference, and it is thus possible to discriminate between the forward rotation and the reverse rotation when detecting the rotation of the detection rotor.

For example, in a case in which the rotary member (connecting destination) to be rotated by the actuator is a rotary on-off valve that turns on and off by rotating inside a vehicle-mounted pipe (valve), the rotary on-off valve is rotated according to the instruction from the actuator. The rotary on-off valve is turned on or off when an external input signal reaches a predetermined threshold value, for example.

When resuming the rotating state during a stopped period, the actuator drives the rotary on-off valve in a closing or opening direction. Hence, the forward rotation or the reverse rotation of the rotary member is determined automatically.

On the other hand, while the rotary member is stopped at an intermediate rotational position, the state of the rotary member may change unintentionally due to external vibration or the like, even when no driving force is applied. In this case, it is desirable to accurately detect whether the rotary member is rotating in the forward direction or the reverse direction.

As illustrated in FIG. 14, by arranging the brushes 42 and 43 to correspond to different phases with respect to the detection part 12 in which the conducting region 16 and the isolated region 17 forming the non-conducting region are alternately arranged, it becomes possible to detect the forward rotation and the reverse rotation of the detection rotor that undergoes interlocking rotation with the rotary member.

Accordingly, the forward rotation and the reverse rotation of the detection rotor is detectable by the rotation sensor device itself, without requiring additional devices for discriminating between the forward rotation and the reverse rotation. In addition, it is possible to simplify the wirings on the circuit board that is provided at a subsequent stage to which the terminals are connected.

According to the described embodiments, it is possible to prevent deterioration caused by the brush contact and the centrifugal force, to extend the serviceable life of the slip ring.

The present invention is described above based on each of the embodiments, however, the present invention is not limited to the requirements of the described embodiments. The present invention may be modified without departing from the scope of the present invention, and may be appropriately varied depending on applications of the embodiments.

For example, in the described embodiments, the detection rotor is segmented by 12 slits along the circumferential direction, into 12 segments. However, the number of segments is not limited to 12.

For example, in a case in which n detections are made during 1 revolution of the detection rotor, each element is set to the following numerical values, where n is a positive number greater than or equal to 2. 2×n slits 2, extending in the axial direction, are formed in the side surfaces on the outer peripheries of the metal ring 10 and the resin ring 20.

In the metal ring 10, the side surface at one end along the axial direction of the approximately cylindrical shape forms the common part 11, and the common part 11 is segmented by the slits into 2×n segments respectively including the common region 14. The adjacent common regions 14 can be electrically connected to each other.

The side surface at the other end along the axial direction of the approximately cylindrical shape forms the detection part 12. The detection part 12 is segmented by the slits 12 into 2×n segments respectively including the conducting region 16 that can be electrically connected to the common region 14, and the isolated region 17 that is isolated from and cannot be electrically connected to the common region 14. The n conducting regions 16 and the n isolated regions 17 are alternately provided, with the slit 2 interposed between the adjacent conducting region 16 and isolated region 17. n through-holes 19 are formed.

In order to enable electrical connection of the adjacent metal regions (common regions 14) that are segmented by the slits 2 in the common part 11, (n×2−1) projecting bent parts 15 are provided at the edge part of the side surface at one end of the common part 11, and these projecting bent parts 15 are bent so as to project in the inner radial direction of the approximately cylindrical shape.

Even in the configuration in which the numerical values of the elements are changed as described above, the part contacted by the brush is made of metal, and the brush does not contact the resin, similarly as in the case of the embodiment described above. Hence, it is possible to prevent a deterioration in the detection quality caused by the brush contacting the resin. In addition, similarly as in the examples illustrated in FIGS. 5A through 5F, FIG. 6, and FIG. 7, the metal ring may be covered by the molded resin during the manufacturing stage, even when the number of segments changes. Accordingly, it is possible to prevent peeling of the metal even when the centrifugal force is applied. Therefore, the disclosed rotation sensor device can extend the serviceable life of the slip ring.

What is claimed is:

1. A slip ring for use in a slip ring brush type rotation sensor device, comprising
a metal ring having a cylindrical or approximately cylindrical shape; and
a resin ring that supports the metal ring,
wherein 2×n slits, extending in an axial direction, are formed in respective side surfaces on outer peripheries of the metal ring and the resin ring, where n is a positive number greater than or equal to 2,
wherein the metal ring includes
a common part formed on a side surface at one end along the axial direction of the cylindrical or approximately cylindrical shape and segmented by the slits into 2×n segments to form 2×n common regions, so that adjacent common regions are electrically connectable to each other, and
a detection part formed on a side surface at the other end along the axial direction of the cylindrical or approximately cylindrical shape and segmented by the slits into 2×n segments to form n conducting regions that are electrically connectable to the common regions, and n isolated regions that are isolated from and not electrically connectable to the common regions, wherein the conducting regions and the isolated regions are alternately provided with the slit interposed between adjacent conducting region and isolated region.

2. The slip ring as claimed in claim 1, wherein (n×2−1) or (n×2) projecting bent parts are provided at an edge part of the side surface of the common region, the projecting bent parts are bent so as to project in an inner radial direction of the cylindrical or approximately cylindrical shape, and a bent part of the projecting bent parts electrically connect adjacent common regions at the common part without being segmented by the slits.

3. The slip ring as claimed in claim 2, wherein the projecting bent parts include semi-oval ring-shaped projecting parts having rounded tip ends and projecting in the inner radial direction of the cylindrical or approximately cylindrical shape.

4. The slip ring as claimed in claim 1, wherein the resin ring includes
a inner resin part covering an entire inner peripheral side surface of the cylindrical or approximately cylindrical shape of the metal ring,
a bottom surface resin part covering entire bottom surfaces at the one end and the other end of the cylindrical or approximately cylindrical shape of the metal ring from both ends, and
a central resin part located on an outer peripheral surface of the cylindrical or approximately cylindrical shape of the metal ring, between the common part and the detection part, to form a part of a side surface of the slip ring.

5. A rotation sensor device comprising:
a slip ring as claimed in claim 1;
a driving shaft interlocked to an inside of the cylindrical or approximately cylindrical shape of the slip ring;
a first brush arranged to oppose the common part of the slip ring; and
a second brush arranged to oppose the conducting regions and the isolated regions of the detection part of the slip ring,
wherein the first brush and the second brush makes no contact with a resin part of the slip ring.

6. A method of manufacturing a slip ring for use in a slip ring brush type rotation sensor device, comprising the steps of:
forming a central groove part parallel to long sides of an approximately rectangular metal plate and dented from a first surface at a central part of short sides of the approximately rectangular metal plate by a joggling process, and forming n elongated holes that penetrate to a second surface opposite to the first surface intermittently in the central groove part, and (n×2−1) projecting parts that project together from a predetermined region with respect to an edge part of one of the long sides, by a die-blanking process, where n is a positive number greater than or equal to 2;
bending the (n×2−1) projecting parts toward the second surface to form projecting bent parts by a bending process;
rounding the long sides of the approximately rectangular metal plate to join the short sides to each other to form a cylindrical or approximately cylindrical shape by a rounding process;
molding the rounded metal plate having the cylindrical or approximately cylindrical shape after the rounding process with a resin by a molding process; and
forming (n×2) slits in an outer peripheral surface of the rounded metal sheet having the cylindrical or approximately cylindrical shape and in an outer peripheral surface of the molded resin by a slitting process,
wherein the step of forming the slits includes
forming a common part at a metal part on an end provided with the projecting bent parts, to include (n×2) common regions segmented by the slits, and
forming a detection part at a metal part on another end not provided with the projecting bent parts, to include n conducting regions that are electrically connectable to the common regions at a part of the metal part on the other end where the elongated holes are interrupted, and n isolated regions that are isolated from and not electrically connectable to the common regions at a part of the metal part on the other end where the elongated holes extend,
wherein the conducting regions and the isolated regions are alternately provided with the slit interposed between adjacent conducting region and isolated region.

7. The method of manufacturing the slip ring as claimed in claim 6, wherein the step of molding includes
forming an inner ring resin part covering an entire inner peripheral side surface of the cylindrical or approximately cylindrical shape of the metal sheet,
forming a detection end resin part covering the metal sheet having the cylindrical or approximately cylindrical shape by an annular shape having a predetermined width between a lower end of the metal sheet having the cylindrical or approximately cylindrical shape and a bottom of a metal die for molding a resin,
forming a common end resin part covering an upper surface of the metal sheet having the cylindrical or approximately cylindrical shape by an annular shape having a predetermined width from an upper end of the metal sheet having the cylindrical or approximately cylindrical shape, and
forming a central resin part located on the outer peripheral surface of the cylindrical or approximately cylindrical shape of the metal sheet, between the common part and the detection part, to form a part of a side surface of the slip ring.

8. The method of manufacturing the slip ring as claimed in claim 7, wherein
in a periphery of the elongated holes in the central groove part of the metal sheet, the central resin part forms the part of the side surface of the slip ring by the resin provided on an outer periphery of the central groove part, and
in the central resin part, the part in the periphery of the elongated holes in the central groove part of the metal sheet is sandwiched by the resin from the outer periphery and an inner periphery of the central groove part.

9. The method of manufacturing the slip ring as claimed in claim 7, wherein
the joggling process is performed with respect to the other edge part of the long side to form an end thinned part having a reduced thickness by being dented from the first surface, and
in the detection end resin part, the end thinned part is sandwiched by the resin from the outer periphery and the inner periphery of the central groove part.

10. The method of manufacturing the slip ring as claimed in claim 7, wherein
the projecting bent parts include semi-oval ring-shaped projecting parts having rounded tip ends, and in the common end resin part, the tip ends of the semi-oval ring-shaped projecting parts is sandwiched by the resin from the outer periphery and the inner periphery of the central groove part.

* * * * *